United States Patent
Morimoto et al.

(10) Patent No.: US 6,369,539 B1
(45) Date of Patent: Apr. 9, 2002

(54) MOTOR DRIVE CONTROLLER FOR VEHICLE

(75) Inventors: Kazuhiko Morimoto; Yoshiaki Omata, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/538,999

(22) Filed: Mar. 30, 2000

(30) Foreign Application Priority Data

Mar. 31, 1999 (JP) .......................................... 11-092620

(51) Int. Cl.⁷ ............................................. H02P 27/30
(52) U.S. Cl. ....................... 318/369; 318/151; 318/152; 318/432; 318/433
(58) Field of Search .......................... 318/45, 151, 152, 318/456, 369, 432, 433

(56) References Cited

U.S. PATENT DOCUMENTS

| | | | |
|---|---|---|---|
| 4,531,491 A | 7/1985 | Iiyama et al. ................ 123/357 |
| 4,589,071 A | 5/1986 | Yamamuro et al. ....... 364/424.1 |
| 4,653,621 A | 3/1987 | Tsukamoto et al. ....... 192/0.032 |
| 5,172,784 A | 12/1992 | Varela, Jr. ................... 180/65.4 |
| 5,495,906 A | 3/1996 | Furutani ..................... 180/65.2 |
| 5,751,137 A | 5/1998 | Kiuchi et al. .................. 322/14 |
| 5,757,153 A | 5/1998 | Ito et al. ...................... 318/370 |
| 5,771,478 A | 6/1998 | Tsukamoto et al. ............ 701/68 |
| 5,839,533 A * | 11/1998 | Mikami et al. .............. 180/165 |
| 5,841,201 A * | 11/1998 | Tabata et al. ............. 290/40 C |
| 5,895,333 A * | 4/1999 | Morisawa et al. .............. 475/5 |
| 5,898,282 A | 4/1999 | Drozdz et al. ............... 318/139 |
| 5,941,796 A | 8/1999 | Lee ............................. 477/158 |
| 5,935,040 A * | 10/1999 | Tabata et al. .................... 477/3 |
| 5,960,897 A | 10/1999 | Furuya et al. ............. 180/65.4 |
| 6,032,753 A | 3/2000 | Yamazaki et al. ......... 180/65.3 |

FOREIGN PATENT DOCUMENTS

| | | |
|---|---|---|
| EP | 0 460 850 | 12/1991 |
| JP | 05322032 A | 12/1993 |
| JP | 08182109 A | 7/1996 |
| JP | 09089090 A | 3/1997 |
| JP | 09093724 A | 4/1997 |
| JP | 09191507 A | 7/1997 |
| JP | 9-238403 | 9/1997 |
| JP | 10201013 A | 7/1998 |
| JP | 2000-13911 | 1/2000 |

* cited by examiner

Primary Examiner—Jeffrey Donels
Assistant Examiner—Rita Leykin
(74) Attorney, Agent, or Firm—Flynn, Thiel, Boutell & Tanis, P.C.

(57) ABSTRACT

The present invention provides a motor drive controller for a vehicle having an engine and a motor disposed therein as a vehicle-propulsion system, the motor having both driving and power-generating functions, comprising: an engine controller for controlling a running state of the engine; motor controller for controlling both driving and power-generating states of the motor in a manner independent of control over the engine taken by the engine controller; vehicle velocity-detector for detecting the speed of the vehicle and engine speed-detector for detecting revolutions of the engine; and engine load-detector for detecting an engine load. The motor controller includes a map defined by respective detection signals from the vehicle velocity-detector and the engine speed-detector, enabling gear position to be calculated.

3 Claims, 7 Drawing Sheets

THIS IS SET FOR EACH POSITION

MOTOR DRIVE CONTROLLER FOR VEHICLE

FIELD OF THE INVENTION

The present invention relates to a motor drive controller for a vehicle and, especially, to a motor drive controller receiving respective detection signals from a vehicle velocity detector and an engine speed detector to determination of the gear position; furthermore, said motor drive controller makes use of the smallest number of sensors that still allows detection of gear position, resulting in a simplified system and reduced production costs.

BACKGROUND OF THE INVENTION

Some motor vehicles are of a type commonly called a hybrid vehicle having an internal combustion engine and an electric motor disposed therein as the power sources of a propulsion system. The hybrid vehicle further includes an engine controller for controlling a running state of the engine and motor controller for controlling an operating state of the motor. The engine controller and the motor controller detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and power performance).

One such example of a vehicle controller is disclosed in published Japanese Patent Application Laid-Open No. 5-322032. The clutch switch failure detection system indicated in this disclosure uses the vehicle velocity and engine speed to determine gear position in the transmission, and from the change in gear position measures the number of shifts, and by matching the number of measured shifts with the number of changes in the signals from the clutch switch, it is able to determine if there is a clutch switch failure and detects such clutch switch failure efficiently.

Also, there is something germane in published Japanese Patent Application Laid-Open No. 8-182109. In the running mode control system of an electric powered vehicle in this disclosure there is a transmission mounted between the vehicle running mode motor and the drive wheel, wherein, as a running mode control system, the transmission control means depends on the shift position, such that, if the shift position exhibits advance, retreat, or neutrality at the same time that a brake demand is being emitted, the response is to use the drive wheel as a regenerative braking means; if, when the shift position exhibits neutrality and there is not a brake demand being emitted, there is a means whereby the power supply to the vehicle running mode motor is shut off, making the regeneration of the vehicle's running energy more possible.

Also, there is something germane in published Japanese Patent Application Laid-Open No. 9-89090. In the synchronous control system of a vehicle in this disclosure, there is a synchronizing mechanism, an electric motor connected with the transmission system's input shaft, a transmission operation detection means which detects whether the lever is at a specified reserve position that it must pass through on its way to a specified gear position, an input shaft detection means which detects the speed of the transmission input shaft, and a control system. When the transmission operation detection means detects that the lever is at a specified reserve position that it must pass through on its way to a specified gear position the speed that the input shaft should reach after shifting gears is predicted based on the input shaft speed and gear ratio, and while the clutch is disengaged an electric motor is controlled synchronically to ensure that the input shaft speed reaches the speed that was predicted, thus increasing the durability of the synchronizing mechanism.

Also, there is something germane in published Japanese Patent Application Laid-Open No. 9-93724. The electric powered vehicle in this disclosure includes a transmission that has at least two alternatively chosen steps, an output axle that is connected to the vehicle's drive wheels via the transmission, an electric motor that is connected electronically to the battery mounted on the vehicle, a driving condition detection means which includes a transmission location detector that detects the transmission steps, and an accelerator opening detection means that detects the accelerator opening. Based on the respective detection data received from the transmission location detector and the accelerator opening detector, there is a control means whereby the drive power generated at the drive wheel is made equal before and after the transmission operations at an equal accelerator opening, by controlling the torque generated in the electric motor in response to the accelerator opening.

Also, there is something germane in published Japanese Patent Application Laid-Open No. 9-191 507. The electric powered vehicle in this disclosure includes a control means such that in an electrically driven vehicle that has a transmission disposed between the motor and drive wheels, when the halt-detection means detects that the vehicle is actually in a halted condition, and the shift-change detection means detects a change from the D-range or the R-range to the N-range or the P-range, the torque-command-value diminishing means directs the torque command value to gradually approach zero, thus reducing the surface pressure on the gear teeth in the transmission and preventing the striking noises that occur when the gears undergo a backlash.

Also, there is something germane in published Japanese Patent Application Laid-Open No. 10-201013. The electric powered vehicle in this disclosure includes a motor control system that includes a target torque setting means that sets the target output torque level for the running motor based on the amount of accelerator operation, and also includes a motor torque control means which controls the running motor output torque in response to the target output torque level set by the target torque setting means. The target torque setting means includes a target torque setting corrective means whereby when the motor speed drops below a predetermined value the target torque is increased and corrected, depending on the motor speed, by an increase and corrective ratio or an increase and corrective quantity. This increase and corrective ratio or increase and corrective quantity is set to become larger as the motor speed drops and smaller as the motor speed rises, thus lessening the load on the acceleration operation during vehicle starts and accelerations as well as allowing more fine-tuned accelerator work.

In the control means of a so-called hybrid vehicle controller heretofore employed, when detecting the gear position in the transmission, detection was made by a gear position sensor for each position. Then, various control operations were carried out using the detection signals provided by said gear position sensors. However, installing gear position detection sensors for every gear in said transmission results in complicated construction, difficulties in manufacture, practical inconveniences, and high costs.

SUMMARY OF THE INVENTION

In order to obviate the above inconveniences, the present invention provides a motor drive controller for a vehicle having an engine and a motor disposed therein as a vehicle-propulsion system, the motor having both driving and power-generating functions, comprising: an engine controller for controlling a running state of the engine; motor controller for controlling both driving and power-generating states of the motor in a manner independent of control over the engine taken by the engine controller; vehicle velocity-detector for detecting velocity of said vehicle, engine speed-detector for detecting revolution of the engine; and, engine load-detector for detecting engine load, wherein the motor controller includes a map defined by respective detection signals from the vehicle velocity-detector and from the engine speed-detector, the map to be used in calculating gear position.

According to the present invention, the motor controller has a function whereby respective detected signals from the vehicle velocity-detector and from the engine speed-detector are used to calculate gear position, and a fewest number of sensors will be used to detect gear position. Accordingly, construction will be simplified and costs will be reduced.

DETAILED DESCRIPTION

Embodiments of the present invention will now be described in detail with reference to the drawings.

Figure 4:
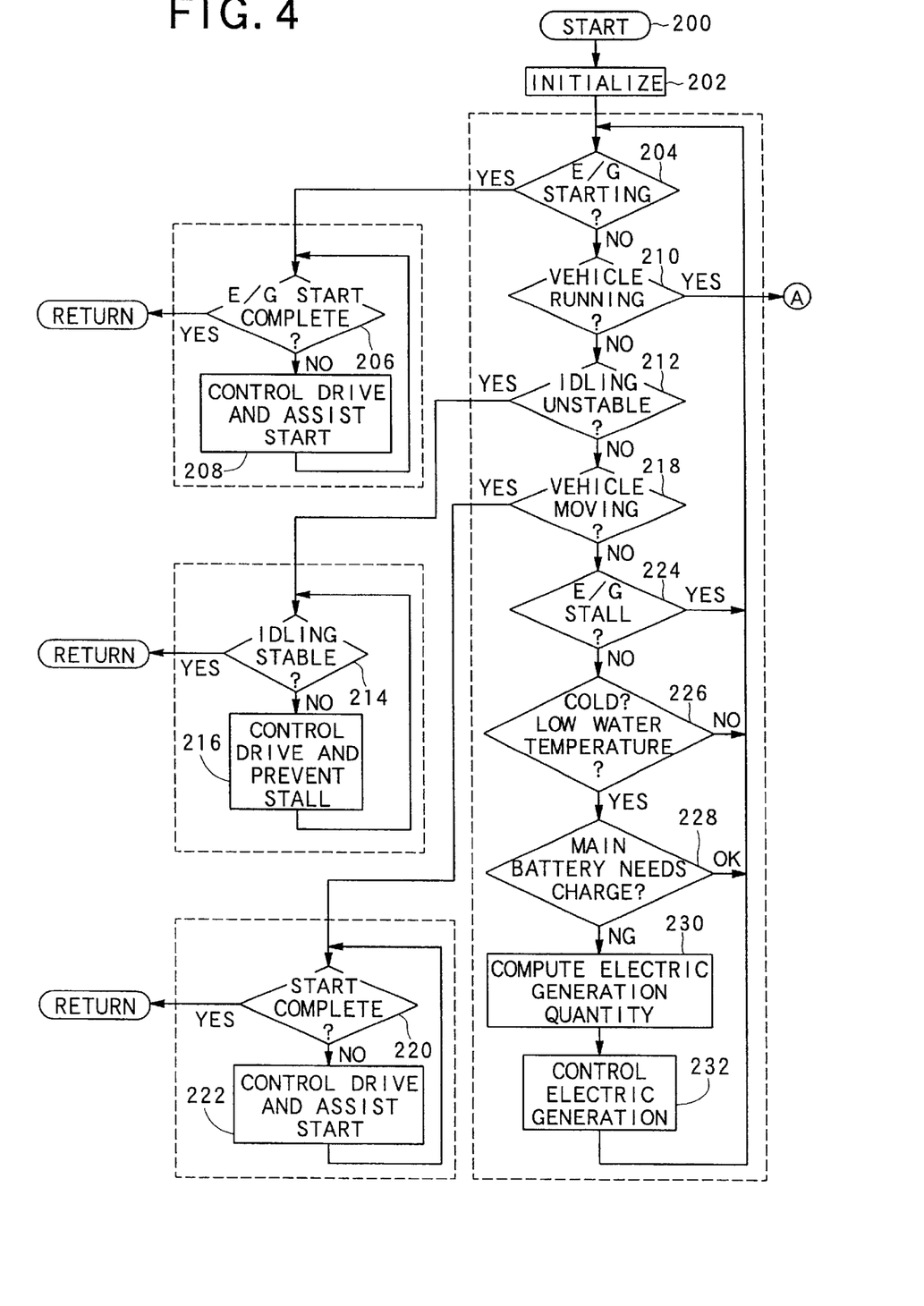
FIG. 4 is a control flowchart in a stopping control mode for use in a controller.
Figure 5:
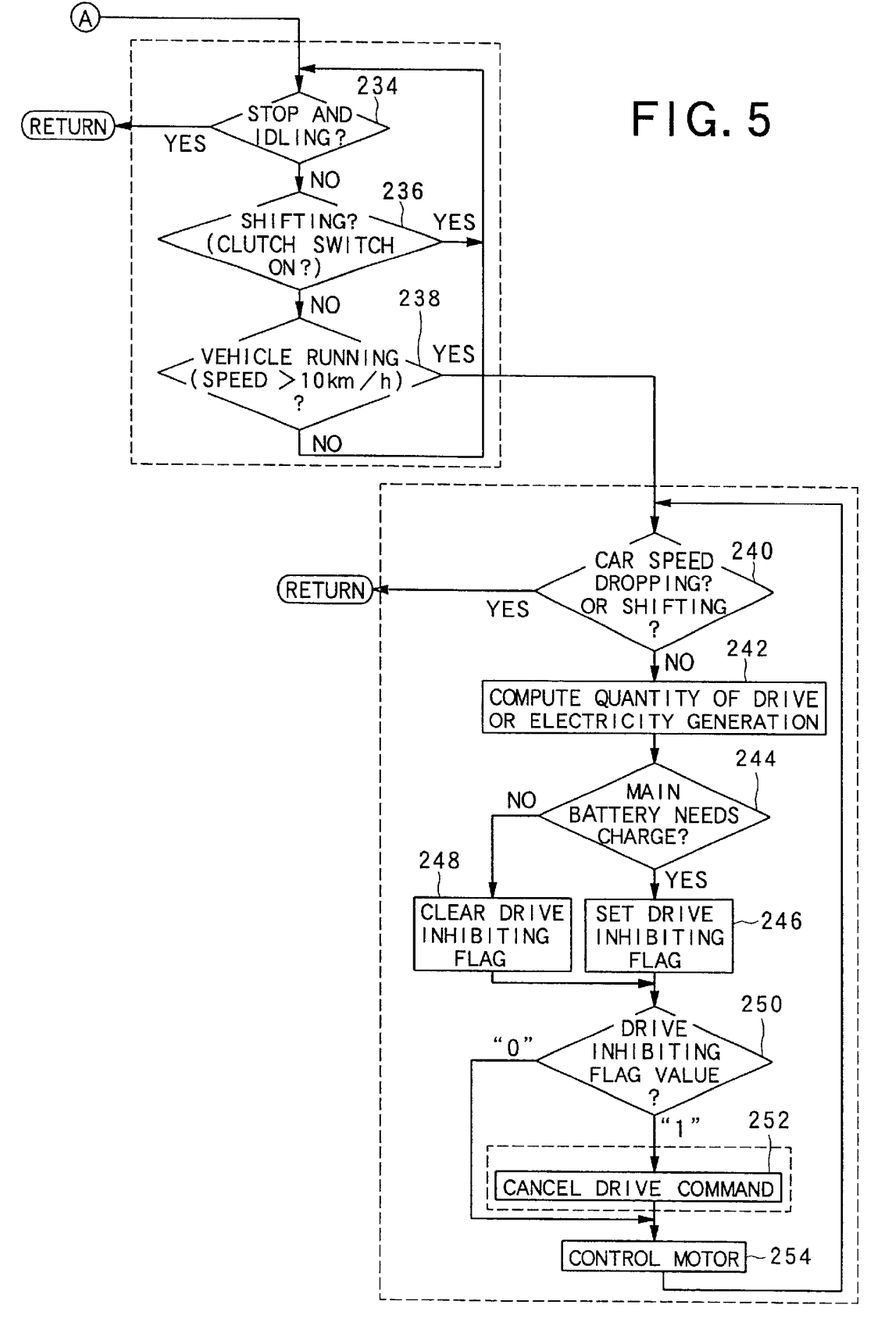
FIG. 5 is a control flowchart in a traveling control mode for use in the controller.
Figure 6:
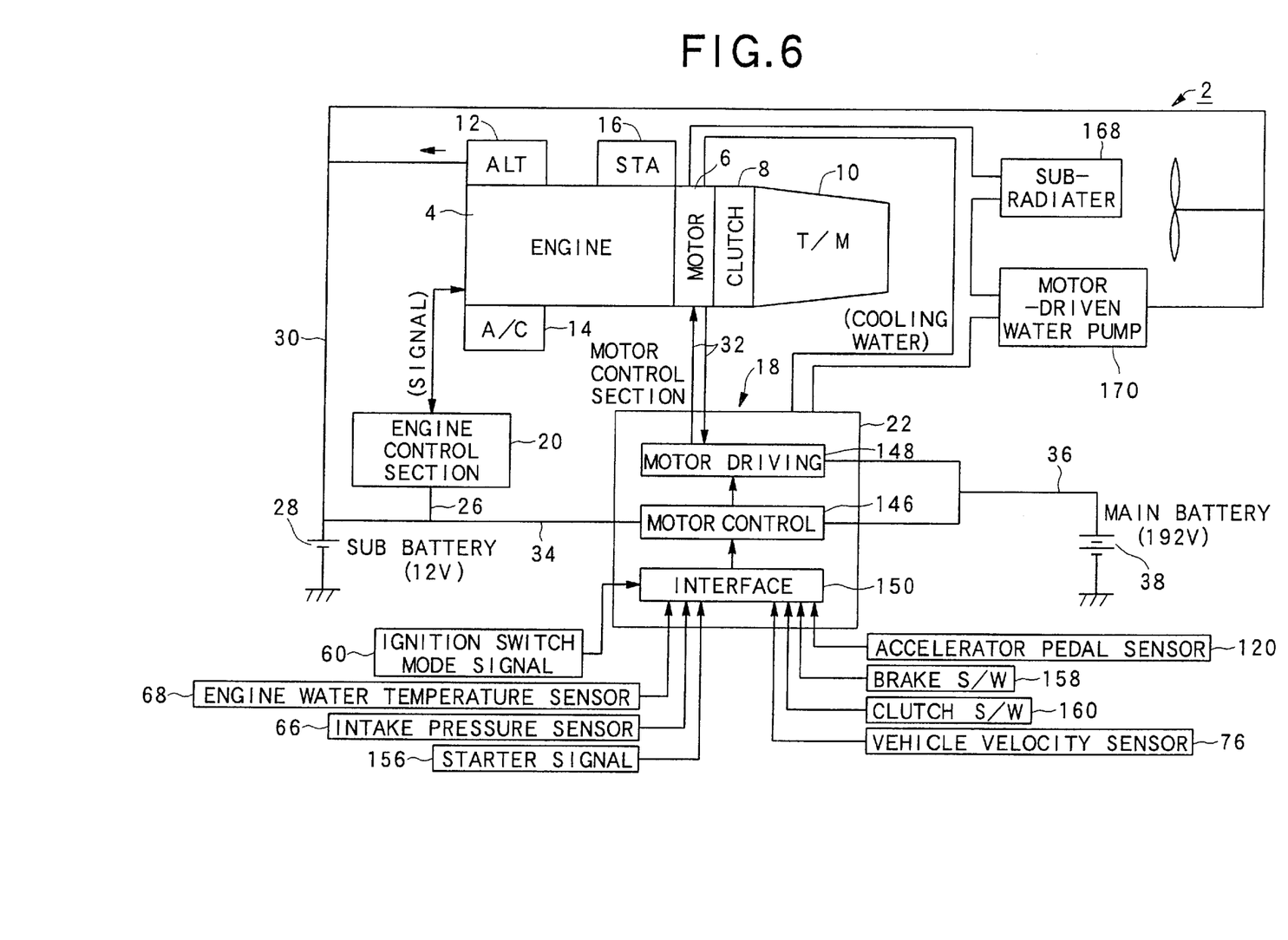
FIG. 6 is a block diagram illustrating a system of the controller for a vehicle-propulsion system.

FIGS. 1–8 illustrate one of the embodiments of the present invention. In FIG. 6, reference numeral 2 denotes a vehicle-propulsion system for a vehicle (not shown); 4 an internal combustion engine; 6 an electric motor; 8 a clutch; and, 10 a manually operated transmission. The vehicle has the engine 4 and the motor 6 disposed therein as the vehicle-propulsion system 2. The motor 6 has both a drive function and a power-generating function.

The motor 6 is connected directly to the engine 4. The transmission 10 is linked to the motor 6 through the clutch 8. The engine 4 includes an alternator 12, an air-conditioner (A/C) compressor 14, and a starter motor 16.

Figure 2:
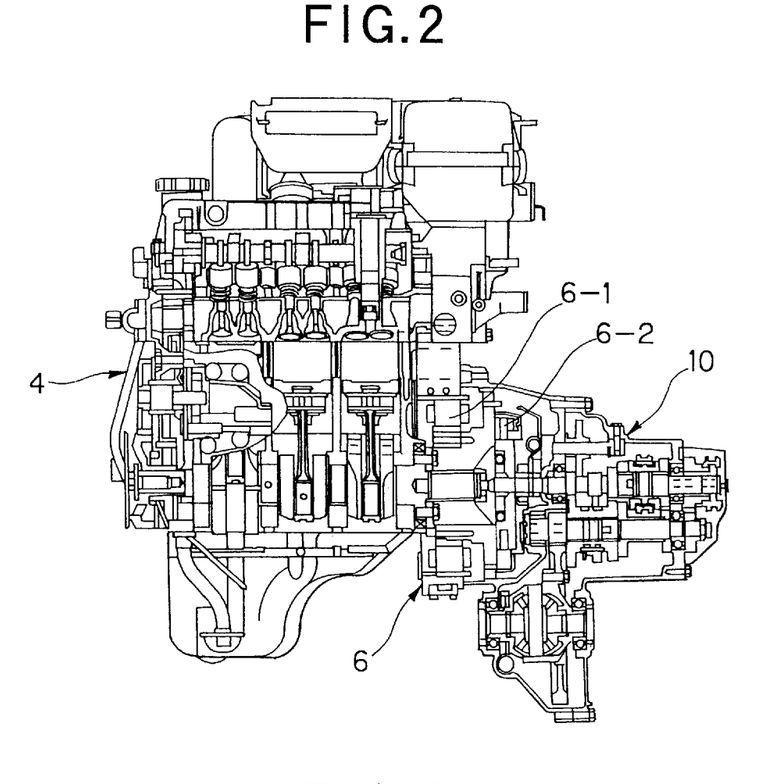
FIG. 2 is a schematic cross-sectional view of an engine.

Referring now to FIG. 2, the motor 6 is shown positioned between the engine 4 and the transmission 10. In addition, the motor 6 includes a stator coil 6-1 and a rotor 6-2 such as a flywheel.

The vehicle-propulsion system 2 includes, as a controller 18, engine control means 20 and motor control means 22. The engine control means 20 controls a running state of the engine 4, while the motor control means 22 controls both driving and power-generating states of the motor 6.

The engine 4 is connected to the engine control means 20 though an engine-controlling signal line 24. Line is used herein to describe any electrical signal conduit. The engine control means 20 is linked to a sub-battery 28 through an engine control means-dedicated power line 26. The sub-battery 28 is coupled to the alternator 12 through a sub-battery-charging power line 30. The sub-battery 28 is a conventional 12 volt vehicle battery.

The motor 6 is connected to the motor control means 22 through a motor-controlling signal line 32. The motor control means 22 is linked to the sub-battery 28 through a motor control means-dedicated sub-power line 34 and the power line 26. The motor control means 22 is also coupled to a main battery 38 through a motor control means-dedicated main power line 36. The main battery 38 supplies driving electric power to the motor 6 and is charged by generated electric power from the motor 6.

Figure 7:
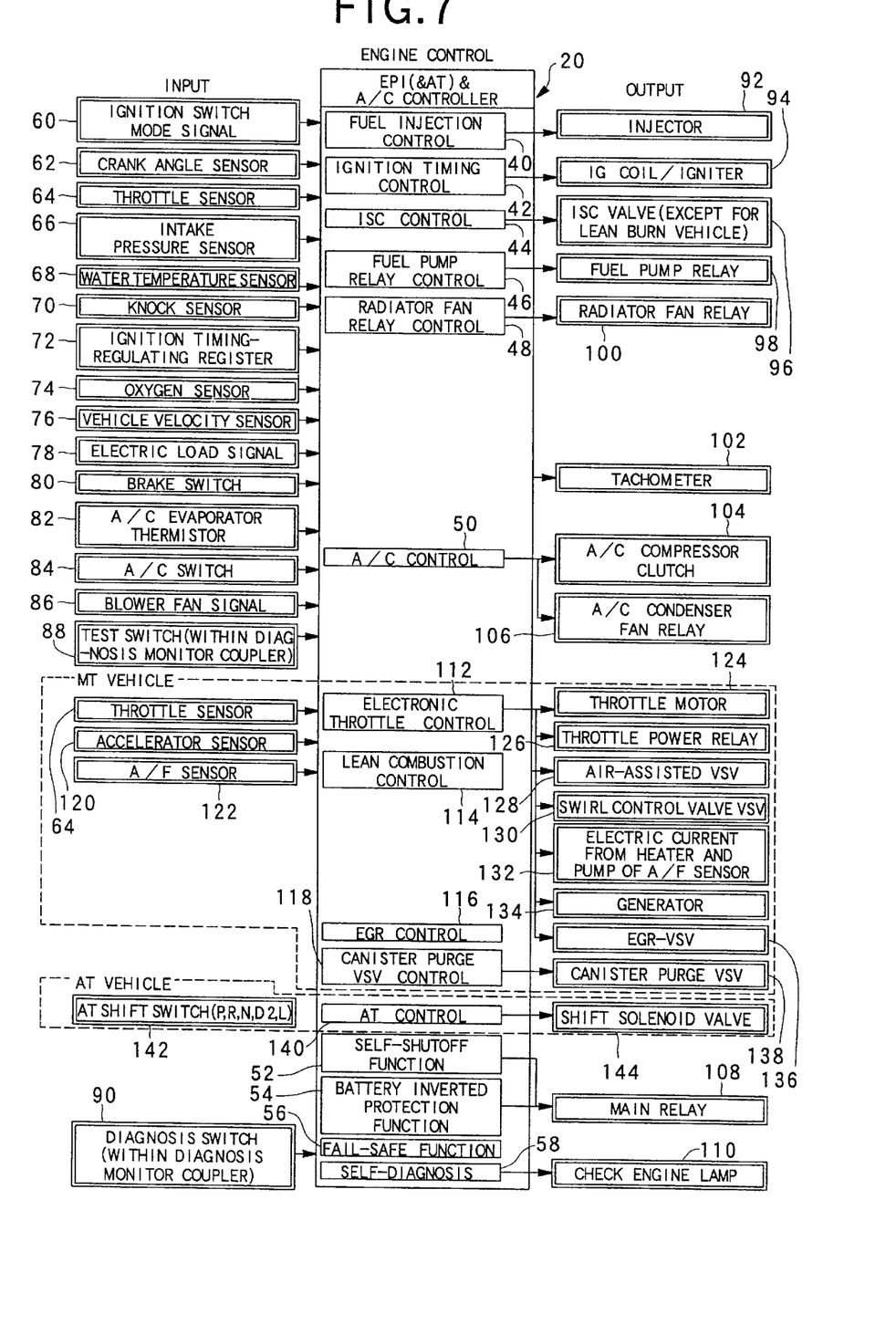
FIG. 7 is a schematic block diagram showing a structure of engine controller.

As illustrated in FIG. 7, the engine control means 20 includes: a fuel injection control section 40; an ignition timing control section 42; an idle speed control (ISC) section 44; a fuel pump relay control section 46; a radiator fan relay control section 48; an air-conditioner (A/C) control section 50; a self-shutoff function section 52; a sub-battery inverted polarity protection function section 54; a fail-safe function section 56; and a self-diagnosis section 58.

The engine control means 20 is connected at the input side to: an ignition switch 60; a crank angle sensor 62; a throttle sensor 64; an intake pressure sensor 66; a water temperature sensor 68; an engine knock sensor 70; an ignition timing-regulating register 72; an oxygen sensor 74; a vehicle velocity sensor 76; an electric load sensor 78; a brake switch 80; an A/C evaporator thermistor 82; an A/C switch 84; a blower fan 86; a test switch 88; and a diagnosis switch 90.

The engine control means 20 is linked at the output side to: an injector 92; an ignition coil/igniter 94; an ISC valve 96; a fuel pump relay 98; a radiator fan relay 100; a tachometer 102; an A/C compressor clutch 104; an A/C condenser fan relay 106; a main relay 108; and, a check engine lamp 110.

When the transmission 10 is of a manually-operated type, then the engine control means 20 further includes the following as enclosed by a dashed line; an electronic throttle control section 112; a lean combustion control section 114; an EGR control section 116; and a canister purge valve control section 118. In this case, the engine control means 20 is connected at the input side to an accelerator sensor 120 and an air/fuel (A/F) sensor 122 as well as the throttle sensor 64. In addition, the engine control means 20 is linked at the output side to: a throttle motor 124; a throttle power relay 126; an air-assisted valve 128; a swirl control valve 130; a heater and pump 132 of the A/F sensor 122; a generator 134; an EGR valve 136; and a canister purge valve 138. Valves 128, 136 and 138 are vacuum switch valves (VSV).

Alternatively, when the transmission 10 is of an automatically operated type (AT), then the engine control means 20 further includes an AT control section 140. In this case, the engine control means 20 is connected at the input side to an AT shift switch 142, while being linked at the output side to a shift solenoid valve 144.

The engine control means 20 drives the injector 92 and the ignition coil/ignitor 94 in response to signals from the crank angle sensor 62 and the throttle sensor 64, thereby controlling a running state of the engine 4 such as a fuel injection quantity and ignition timing.

Figure 8:
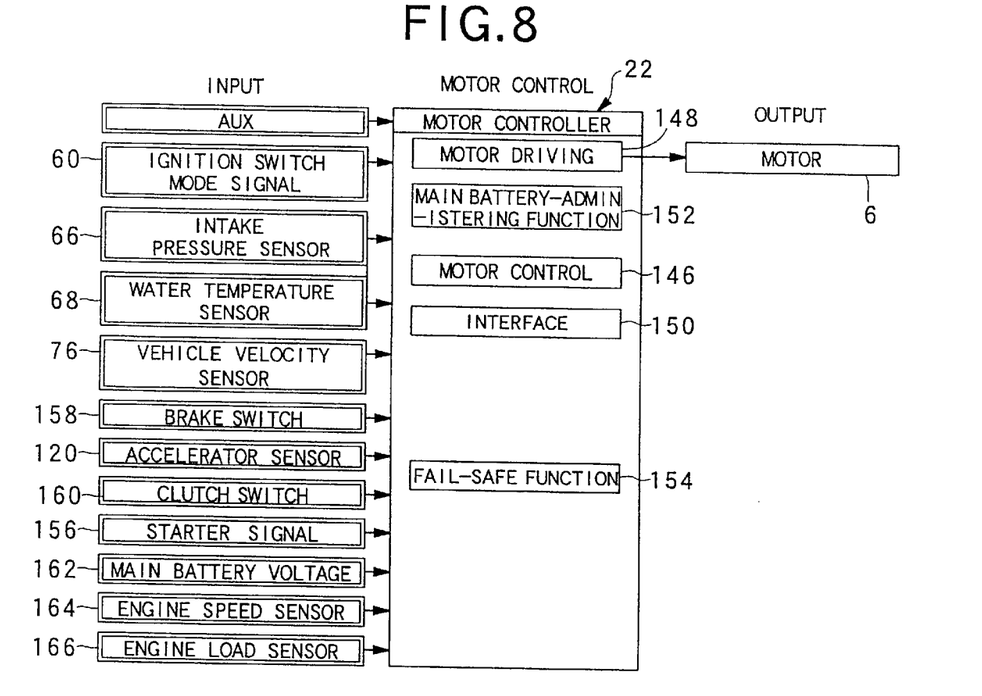
FIG. 8 is a schematic block diagram showing a structure of motor controller.

Referring to FIG. 8, the motor control means 22 is shown including a motor control section 146, a motor-driving section 148, an input/output-processing section (interface) 150, a main battery mode-administering section 152, and a fail-safe section 154.

The motor control means 22 is connected at the input side to a starter switch 156, a brake switch 158, a clutch switch 160, a main battery voltage detector 162, an engine rotational speed-detecting means or an engine speed sensor 164, and an engine load-detecting means or an engine load sensor 166, as well as the ignition switch 60, the-intake pressure sensor 66, the water (coolant) temperature sensor 68, the vehicle velocity sensor 76, the accelerator sensor 120.

The motor control means 22 is linked at the output side to the motor 6.

The controller 18 of the vehicle-propulsion system 2 includes both the engine control means 20 and the motor control means 22. The engine control means 20 controls an operating state of the engine 4, while the motor control means 22 controls both driving and power-generating states of the motor 6. The motor control means 22 exchanges no data with the engine control means 20. More specifically, the motor control means 22 is independent of control over the engine 4 executed by the engine control means 20, and thus independently controls and determines the driving and power-generating states of the motor 6.

The motor control means 22 is set into a stopping control mode or a traveling control mode as control modes that are based on a running state of the vehicle. In addition, the motor control means 22 is at first put into a drive/power generation-prohibiting control mode when switching over between the stopping control mode and the traveling control mode. In this way, the motor control means 22 executes control over the motor 6. The drive/generation-prohibiting control mode prohibits both driving and power generation of the motor 6.

The motor control means 22 receives a main battery voltage signal from the main battery voltage detector 162. The detector 162 detects a main battery voltage of the main battery 38. The battery 38 supplies driving electric power to the motor 6 or is charged by generated electric power from the motor 6. Further, the motor control means 22 has control over the main battery mode-administering section 152 in such a manner that the administering section 152 governs a main battery mode according to the main battery voltage.

The stopping control mode of the motor control means 22 may be set into an idling power generation control mode, a starting drive control mode, a start-up drive control mode, and an idle-stabilized drive control mode. When in the idling power generation control mode, the motor control means 22 assumes control over the motor 6 so as to permit the motor 6 to generate power and then charge the main battery 38 therewith. When in the starting vehicle motion drive control mode, the motor control means 22 executes control over the motor 6 so as to drive the motor 6 and then assists in starting the vehicle. In the start-up drive control mode, the motor control means 22 provides control over the motor 6 so as to drive the motor 6 and then assists in starting up the engine 4. In the idle-stabilized drive control mode, the motor control means 22 provides control over the motor 6 so as to drive the motor 6 and stabilize idling of the engine 4.

The traveling control mode of the motor control means 22 may be set into a drive/power generation-permitting control mode, a drive-prohibiting control mode, and a drive/power generation-prohibiting control mode. In the drive/power generation-permitting control mode, the motor control means 22 provides control over the motor 6 so as to permit either of the driving or power generation of the motor 6. In the drive-prohibiting control mode, the motor control means 22 executes control over the motor 6 so as to prohibit the driving of the motor 6, but to permit the motor 6 to generate power. In the drive/power generation-prohibiting control mode, the motor control means 22 executes control over the motor 6 so as to prohibit both the driving and power generation of the motor 6.

The motor control means 22 switches over between the above-described drive/power generation-permitting control mode and drive-prohibiting control mode according to the main battery voltage of the main battery 38 governed by the main battery mode-administering section 152 of the motor control means 22.

More specifically, when the main battery voltage is charged at 100% (SOC), then the motor control means 22 is in the drive/power generation-permitting control mode, and assumes control over the motor 6 so as to permit either the driving or power generation of the motor 6. However, when the main battery voltage falls below a lower limit or a drive-prohibiting determination voltage, then the motor control means 22 is put into the drive-prohibiting control mode.

In the drive-prohibiting control mode, the motor control means 22 gains control over the motor 6 so as to prohibit the driving of the motor 6, but to permit the motor 6 to generate power until the main battery voltage reaches a drive/power generation-permitting determination voltage. When the main battery voltage exceeds the drive/power generation-permitting determination voltage, then the motor control means 22 is returned to the drive/power generation-permitting control mode. In this mode, the motor control means 22 effects control over the motor 6 so as to permit both the driving and power generation of the motor 6.

The transition from the drive/power generation-permitting control mode to the drive-prohibiting control mode is made when any one of the following transitional conditions is satisfied:

(1) A main battery open-circuit voltage continues to be less than the drive-prohibiting determination voltage for a predetermined period of time;

(2) A driving main battery voltage continues to be less than a driving lower limit-determining voltage (a set value for each driving torque) for a predetermined period of time;

(3) A value obtained from the main battery open-circuit voltage minus a driving voltage is greater than a maximum voltage variation value immediately after driving (a set value for each driving torque) when a predetermined period of time elapses after the motor 6 starts its driving;

(4) The main battery open-circuit voltage continues to be greater than a driving maximum voltage drop value (a set value for each driving torque) for a predetermined period of time; and (5) The motor 6 is caused to stop after a predetermined period of time elapses after the driving of the motor 6 starts, and when the open-circuit voltage of the main battery is then detected and found to be continually less than the drive-prohibiting determination voltage (a set value for each torque) for a predetermined period of time.

In addition, when the above No. (5) condition is unsatisfied, then the motor 6 resumes its driving state to assist in propelling the vehicle.

Another transition from the drive-prohibiting control mode to the drive/power generation-permitting control mode is made when any one of the following transitional conditions is met:

(1) The main battery open voltage continues to be greater than the drive/power generation-permitting determination voltage over a predetermined period of time;

(2) A power-generating main battery voltage continues to be greater than a power-generating upper limit-determining voltage (a set value for each power-generating torque) for a predetermined period of time;

(3) The motor 6 is caused to stop generating power when a predetermined period of time elapses after the motor 6 starts generating power, and then the main battery open-circuit voltage is detected; and the main battery open-circuit voltage continues to be greater than the drive/power generation-permitting determination voltage over a predetermined period of time.

In addition, when a determination as to the above transitional condition No. (3) is terminated, then the motor control means 22 is put back into the control mode that was operative before such a determination was made, regardless of whether or not the above transitional condition No. (3) was met. Then, the motor control means 22 maintains such control. In addition, the time when the motor control means 22 is returned to the aforesaid control mode is newly defined as a power generation-starting time.

Moreover, the motor control means 22 includes the added function whereby respective detection signals from the vehicle velocity detection sensor 76 and the engine speed detection sensor 164 allows determination of the gear position.

More specifically, after the motor control means 22 receives detection signals from the vehicle velocity detection sensor 76 and the engine speed detection sensor 164 a ratio of the vehicle velocity and the engine speed, for example, dividing the vehicle velocity by the engine speed (an inversion of vehicle velocity and engine speed is also possible) would yield a value whereby the gear position could be determined.

An outline of the conditions for determination of gear position in regard to motor control means 22 follows:

(1) when selecting the reverse position-also termed low gear ($1^{st}$)

(2) when stopping the engine -neutral (3) when the vehicle velocity is other than zero-low gear (4) when the clutch is unengaged-the previously determined gear.

To add to the conditions for determination of gear position, when the vehicle is not moving and the clutch pedal is not being pressed down the determination will be neutral; when the vehicle is not moving, and the clutch is being pressed down the determination will be low gear.

Also, at times when the vehicle is in a traveling mode and the clutch pedal is pressed down in order to shift gears and the relation between the vehicle velocity and the engine speed is not in a fixed relation, then the previously determined gear, that is, the last gear position to be recognized, will continue to be used; when the shifting operation is complete and a new gear position has been determined, a new gear position will be selected and used. Moreover, conditions when the relation between the vehicle velocity and the engine speed is not a fixed relation will include the condition when the tires spin freely causing sharp fluctuations in the relation between the vehicle velocity and the engine speed.

In addition, when reverse is being selected, the determination should be low gear, in cases when a reverse lamp switch (not shown) is in the ON position the gear position will be judged neutral.

To add to the explanation of the vehicle velocity sensor 76, in addition to the vehicle velocity being detected by the respective revolution sensors attached to the driven wheels and the free wheels, detection is also possible by a relative speed sensor (also known as a ground sensor) attached to the vehicle body. These sensors may serve as substitutes for the vehicle velocity sensor 76.

Figure 3:
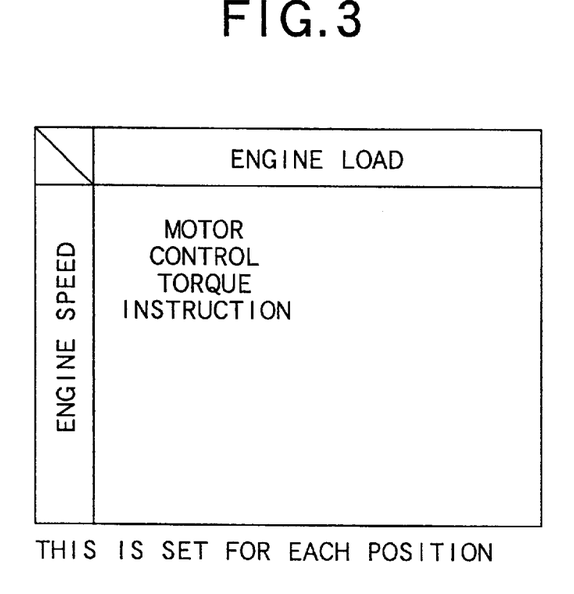
FIG. 3 is a map defined by detection signals from an engine speed-detector and an engine load-detector.

Also, the motor control means 22, as shown in FIG. 3, wherein the motor control means has a map provided therein for each gear position, the map being defined by respective detection signals from the engine speed-detecting sensor 164 and the engine load-detecting sensor 166, and wherein the motor control means includes a function enabling it to search out the motor control map used to engage the gear position when determining that position. The map can be electronically or electro-magnetically stored in the motor control means and is electrically connected to the motor control means.

The motor drive control map, as shown in FIG. 3, is a two-dimensional map being defined by an engine speed axis derived from detection signals from the engine speed-detecting sensor 164 and an engine load axis derived from the engine load-detecting sensor 166, and wherein a torque instruction value according to an operating state of the engine is preset in the motor control means.

In the present embodiment, the engine 4 is connected directly to the motor 6 that is positioned between the engine 4 and the manually operated transmission 10 as illustrated in FIG. 2. However, as long as motor 6 is communicated to the engine 4, a different position is possible, for example, a motor 6A (FIG. 9) may be disposed at an opposite end of the engine 4 relative to a position where the transmission 10 is connected to the engine 4. In this case, the motor 6A includes a stator coil 6A-1 and a rotor 6A-2. The rotor 6A-2 is connected to the crank shaft of engine 4.

Figure 9:
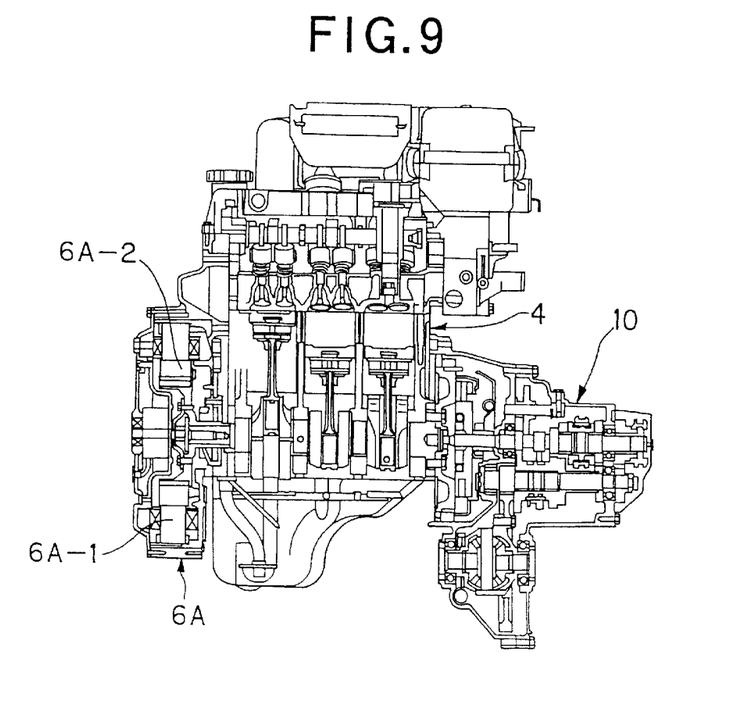
FIG. 9 is a schematic cross-sectional view illustrating a different construction of an engine.

In this connection, reference numerals 168 and 170 denote a cooling sub-radiator for the motor 6 and a motor-driven water pump, respectively. The water pump 170 is driven under the control of the motor control means 22, thereby supplying the motor 6 with cooling water.

Operation of the embodiment will now be described with reference to a control flowchart in FIGS. 4 and 5 for use in the controller.

As shown in FIG. 6, the motor control means 22 is set into the stopping control mode and the traveling control mode as a select control mode that is based on an operating state of a vehicle.

Referring now to FIG. 4, when the motor control means 22 in the stopping control mode, it starts control at step 200, then the program is initialized at step 202. Then, a determination is made at step 204 as to whether the engine 4 is starting up.

When the determination in step 204 results in "YES", then it is determined at step 206 whether the start-up of the engine 4 has been completed. When the determination in step 206 is "YES", then the routine is returned to previous step 204. However, when the answer to the determination in step 206 is "NO", then the motor control means 22 is put into a start-up drive control mode. The motor control means 22 then provides control over the motor 6 at step 208 so as to drive the motor 6 and assist in starting the engine 4. Then, the routine is returned to previous step 206.

When the determination in previous step 204 is "NO", then a determination is made at step 210 as to whether the vehicle is traveling. When the answer to the determination in step 210 is "YES", then the motor control means 22 is shifted to the traveling control mode as hereinafter described. When the determination in step 210 is "NO", then it is determined at step 212 whether idling is unstable.

When the determination in step 212 results in "YES", then it is determined at step 214 whether such idling has been stabilized. When the determination in step 214 is "YES", then the routine is returned to previous step 212. However, when the determination in step 214 results in "NO", then the motor control means 22 is put into an idle-stabilized drive control mode. The motor control means 22 when executes control over the motor 6 at step 216 so as to drive the motor 6 and stabilize idling of the engine 4. Then, the routine is returned to previous step 214.

When the determination in previous step 212 results in "NO", then it is determined at step 218 whether the vehicle has started moving. When the determination in step 218 is "YES", then a further determination is made at step 220 as to whether such vehicle motion has started. When the determination in step 220 is "YES", then the routine is returned to previous step 218. However, when the determination in step 220 results in "NO", then the motor control means 22 is put into a starting motion drive control mode. The motor control means 22 then effects control over the motor 6 at step 222 so as to drive the motor 6 and assist in starting motion the vehicle. Then, the routine is returned to previous step 220.

When the determination in previous step 218 is "NO", then it is determined at step 224 whether the engine 4 is stalled. When the determination in step 224 is "YES", then the routine is returned to previous step 204. When the determination in step 224 is "NO", then a determination is made a step 226 as to whether the engine 4 is in a cold state and water temperature is low.

When the answer to the determination in step 226 is "NO", then the routine is returned to previous step 204. However, when the determination in step 226 results in "YES", then it is determined at step 228 whether the main battery 38 needs to be charged.

When the determination in step 228 results in "OK" because the main battery 38 need not be charged, then the routine is returned to previous step 204. However, when the determination in step 228 is "NG" because the main battery 38 must be charged, then a quantity of generated electric power is calculated at step 230. Further, the motor 6 is controlled at step 232 so as to generate power. Then, the routine is returned to previous step 204.

When the determination in step 210 is "YES" because the vehicle is traveling, then the motor control means 22 is at first put into a drive/power generation-prohibiting control mode, and control then shifts to the traveling control mode as illustrated in FIG. 5. In the drive/power generation-prohibiting control mode, a determination is made at step 234 as to whether the vehicle is halted in an idling state.

When the determination in step 234 is "YES", then the routine is returned to previous step 210 in the idling control mode as shown in FIG. 4. When the determination in step 234 is "NO", then it is determined at step 236 whether the clutch switch 160 has been activated (in the course of gear shifting or in a neutral position).

When the determination in step 236 is "YES", then the routine is returned to previous step 234. When the determination in step 236 is "NO", then it is determined at step 238 on the basis of a vehicle velocity signal from the vehicle velocity sensor 76 whether the vehicle is traveling.

When the determination in step 238 is "NO", the routine is returned to previous step 234. However, when the determination in step 238 is "YES", then the motor control means 22 shifts to a drive/power generation-permitting control mode in the traveling control mode. Then, a determination is made at step 240 as to whether vehicle velocity is on the decrease or the clutch switch 160 is on (in the course of gear shifting or in a neutral position).

When the determination in step 240 is "YES", then the routine is returned to previous step 234. When the determination in step 240 results in "NO", then either a driving electrical quantity or a quantity of generated electric power is calculated at step 242, thereby deciding on either a driving order or a power-generating order. It is then determined at step 244 whether the main battery 38 needs to be charged.

When the determination in step 244 is "YES" because the battery 38 needs to be charged, then a drive-prohibiting flag is processed at step 246 so as to be set to one value, here a "1". When the determination in step 244 is "NO" because the main battery 38 need not be charged, then the drive-prohibiting flag is processed at step 248 so as to be another value, here cleared to "0".

It is then determined at step 250 whether the drive-prohibiting flag is either "1" or "0". When the answer to the determination in step 250 is "1", then the motor control means 22 is shifted to a drive-prohibiting control mode. When the result from previous step 242 is the driving order, then the driving order of the motor 6 is canceled at step 252, and only the power-generating order is made effective. When the answer to the determination in step 250 is "0", then the result from previous step 242 is rendered operative. Then, the motor 6 is controlled at step 254 according to either the effective driving order or power-generating order. Thereafter, the routine is returned to previous step 240.

Figure 1:
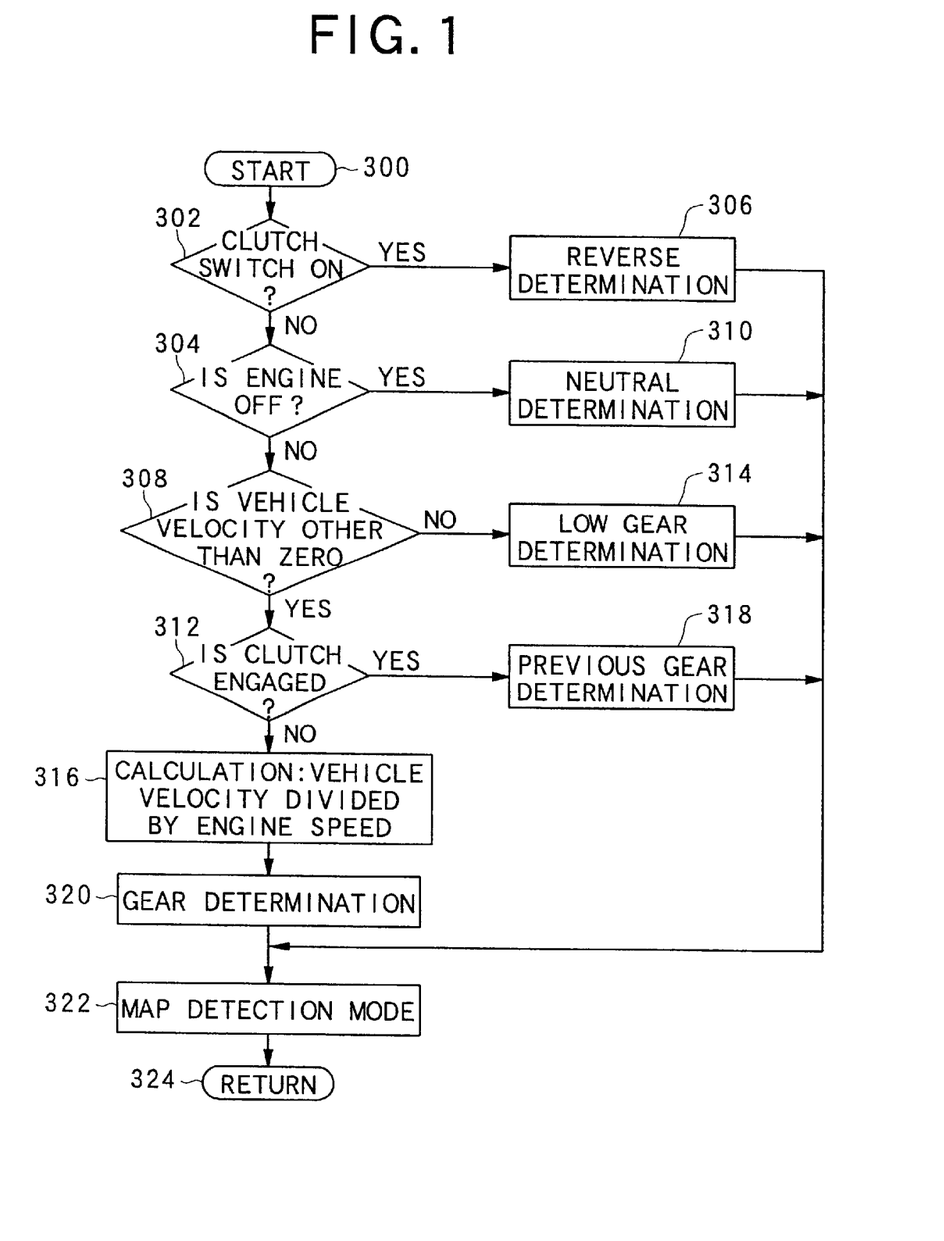
FIG. 1 is a motor drive control flowchart for use in a motor drive controller for a vehicle according to an embodiment of the present invention.

Next, further operation of the embodiment will be described with reference to a motor drive control flowchart in FIG. 1.

When the motor drive control program starts at step 300, then a determination is made at step 302 as to whether the clutch switch (SW) is on. When the determination is "NO", then a determination is made whether the engine is off (304). When the answer to the determination in step 302 is "YES" then it is judged at step 306 to be in the reverse position and the engine control means moves into a map detection mode (322) hereinafter described.

When the answer to the determination in step 304 is "NO", then a determination is made at step 308 whether vehicle velocity is other than zero. When the answer to the determination in step 304 is "YES" then it is judged at step 310 to be in the neutral position and the engine control means moves into a map detection mode (322) hereinafter described.

Also, when the answer to the determination at step 308 whether the vehicle velocity is moving is "YES", then a determination is made at step 312 as to whether the clutch is engaged. When the determination at step 308 is "NO" then it is determined at step 314 to be in low gear and the engine control means moves into a map detection mode (322) hereinafter described.

Also, when the answer to the determination at step 312 whether the clutch is engaged is "NO", an arithmetic operation at step 316 using the engine speed is carried out. When the determination at step 312 is "YES" then the previously determined gear at step 318 continues to be used and the engine control means moves into a hereinafter described map detection mode (322).

Then, after the arithmetic operation at step 316 using the engine speed is carried out the engine control means moves into the map detection mode at step 322; at step 322 the motor control map corresponding to the gear position is detected, and then returns at step 324.

By this means, gear position can be determined using the smallest number of sensors, and it has the practical advantages of a simplified design and construction. As a result, a simplified system is achievable at reduced costs, which is economically advantageous.

Moreover, by being able to discriminate among the different gear positions, it is possible to sub-divide the motor control map to correspond to the various gear positions, thereby enabling a more efficient motor control.

The present invention is not limited to the above, but is susceptible to various applications, changes, and modifications.

For example, in regard to the implementation of this invention the explanation has been based on a vehicle propulsion system characterized by an engine and a motor, said motor having both driving and power-generating functions. The invention is also applicable, however, to electrically-driven cars that include a motor and transmission.

Also, in regard to the implementation of this invention, it was explained that gear position would be determined based on an arithmetical value obtained by dividing the vehicle velocity by the engine speed; however, in calculation of the gear position there is also a possibility of a special construction whereby a corrective function is added to the motor control means. More specifically, a function may be added to the motor control means such that the arithmetical value derived from the vehicle velocity and engine speed ratio will be corrected based on detection signals received from various sensors used to detect the power source and operating environment.

By such means it is possible to calculate gear position based on actual driving conditions, thus increasing gear position reliability. Also, the reliability of the detection of the motor control maps corresponding to gear position, carried out after the calculation of gear position, will improve, thus increasing motor control reliability and having practical benefits.

Moreover, although it was explained in the implementation of the invention that gear position should be determined based on a value derived from vehicle velocity divided by the engine speed, there may arise a need, during the traveling mode, for gear position to be determined by vehicle velocity alone. Therefore, there is also a possibility of a special construction whereby gear position may be provisionally determined by vehicle velocity alone, and then corrected when necessary by motor speed values and other detected values.

By this means, gear position may be determined provisionally by vehicle velocity alone, gear position may be calculated more quickly, and along with improving control responsiveness, the calculation process may be simplified.

As amplified in the above description, the present invention provides a motor drive controller for a vehicle having an engine and a motor disposed therein as a vehicle-propulsion system, the motor having both driving and power-generating functions, comprising: engine control means for controlling a running state of the engine; motor control means for controlling both driving and power-generating states of the motor in a manner independent of control over the engine taken by the engine control means; vehicle velocity-detecting means for detecting the speed of the vehicle and engine speed-detecting means for detecting revolutions of the engine; and engine load-detecting means for detecting an engine load, wherein the motor control means includes a map defined by respective detection signals from the vehicle velocity-detecting-means and the engine speed-detecting means, enabling gear position to be determined by the fewest number of sensors, and simplifying the construction design and the manufacturing process which is advantageous from a practical point of view, and also reducing costs which is economically beneficial. In addition, by being able to discriminate among the different gear positions, it is possible to sub-divide the motor control map to correspond to the various gear positions, thereby enabling a more efficient motor control.

Although particular preferred embodiments of the invention have been disclosed in detail for illustrative purposes, it will be recognized that variations or modifications of the disclosed apparatus, including the rearrangement of parts, lie within the scope of the present invention.

The invention claimed is:

1. A motor drive controller for a vehicle having an engine and a motor disposed therein as a vehicle-propulsion system, the motor having both driving and power-generating functions, comprising: an engine controller for controlling the running state of the engine; a motor controller for controlling both driving and power-generating states of the motor in a manner independent from the control over the engine performed by the engine controller; a vehicle velocity detector for detecting speed of said vehicle, along with an engine speed-detector for detecting revolutions of said engine; and an engine load-detector for detecting engine load; the motor controller including a map defined by respective detection signals from the vehicle velocity detector and the engine speed detector to determine the gear position; and the motor controller including a motor control map provided therein for each gear position, the map being defined by respective detection signals from the engine speed-detector and the engine load-detector, and wherein the motor controller is capable of searching out the motor control map corresponding to the gear position when calculating that position.

2. A motor drive controller as defined in claim 1, the motor control maps each comprising a two-dimensional map defined by an engine speed axis derived from the respective detection signals from the engine speed-dectector and an engine load axis derived from the engine load-dectector, and wherein a torque instruction value according to an operating state of the engine is preset in the map.

3. A motor drive controller for a vehicle having an engine and a motor disposed therein as a vehicle-propulsion system, the motor having both driving and power-generating functions, comprising: an engine controller for controlling the running state of the engine; a motor controller for controlling both driving and power-generating states of the motor in a manner independent from the control over the engine performed by the engine controller; a vehicle velocity detector for detecting speed of said vehicle, along with an engine speed-detector for detecting revolutions of said engine; and an engine load-detector for detecting engine load; the motor controller including a map defined by respective detection signals from the vehicle velocity detector and the engine speed detector to determine the gear position, and wherein the motor controller operates so that an arithmetical value derived from the vehicle velocity and an engine speed ratio, used to determine the gear position, is corrected based on detection signals received from various sensors used to detect a power source and an operating environment of the vehicle.

* * * * *